United States Patent
Lindeman et al.

(10) Patent No.: US 10,742,732 B1
(45) Date of Patent: Aug. 11, 2020

(54) CLOUD STORAGE AND SYNCHRONIZATION OF MESSAGES

(71) Applicant: Apple Inc., Cupertino, CA (US)

(72) Inventors: Kevin J. Lindeman, Morgan Hill, CA (US); Roberto Garcia, Santa Clara, CA (US); Gokul Thirumalai, Mountain View, CA (US); Alexandre A. Aybes, San Francisco, CA (US); Bhaskar P. Sarma, Santa Clara, CA (US); Ori Herrnstadt, Los Altos Hills, CA (US); Raghav V. Pisolkar, Santa Clara, CA (US); Michael D. Ford, Menlo Park, CA (US); Robert Y. Loh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/902,495

(22) Filed: Feb. 22, 2018

Related U.S. Application Data (60) Provisional application No. 62/466,325, filed on Mar. 2, 2017, provisional application No. 62/514,938, filed on Jun. 4, 2017, provisional application No. 62/514,919, filed on Jun. 4, 2017.

(51) Int. Cl.
| | |
|---|---|
| *G06F 15/16* | (2006.01) |
| *H04L 29/08* | (2006.01) |
| *G06F 11/14* | (2006.01) |
| *H04L 12/58* | (2006.01) |

(52) U.S. Cl.
CPC ...... *H04L 67/1095* (2013.01); *G06F 11/1458* (2013.01); *H04L 51/02* (2013.01); *H04L 67/1097* (2013.01)

(58) Field of Classification Search
CPC . H04L 67/1095; H04L 51/02; H04L 67/1097; G06F 11/1458
USPC .......................................... 709/206
See application file for complete search history.

(56) References Cited

U.S. PATENT DOCUMENTS

| | | | | |
|---|---|---|---|---|
| 2013/0198296 | A1* | 8/2013 | Roy | H04L 51/16 709/206 |
| 2014/0310365 | A1* | 10/2014 | Sample | H04L 51/16 709/206 |
| 2017/0126597 | A1* | 5/2017 | Hitchcock | G06Q 10/107 |

\* cited by examiner

*Primary Examiner* — Alan S Chou
(74) *Attorney, Agent, or Firm* — Morgan, Lewis & Bockius LLP (57) ABSTRACT

A messaging system uses a cloud storage backup system for messages and a temporary storage for messages that are not deliverable to offline devices at the time that the messages are sent by one or more messaging servers. The messages are backed up through a synchronization process that transfers a batch of a plurality of messages rather than a single message or an entire database of messages. A conversation state can be synchronized first before synchronizing messages through the transfer of one or more batches of messages.

21 Claims, 8 Drawing Sheets

Conversation State (for a Conversation)

- Sender's Phone Number or Email Address
- Receiver's Phone Number or Email Address

⋮

- Another Receiver's Phone Number or Email Address
- Group Identifier (Optional)
- Last Read Timestamp for Sender's Message Account (Optional)
- List of Message Record Identifiers for Messages in the Conversation (Optional)

FIG. 8

CLOUD STORAGE AND SYNCHRONIZATION OF MESSAGES

This application claims the benefit of U.S. Provisional Application No. 62/466,325 filed on Mar. 2, 2017, U.S. Provisional Application No. 62/514,938 filed on Jun. 4, 2017, and U.S. Provisional Application No. 62/514,919 filed on Jun. 4, 2017, all of which are incorporated herein by reference.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, Calif. have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

SUMMARY OF THE DESCRIPTION

A messaging system uses a cloud storage backup system for messages that were sent and received through the messaging system and a temporary storage for messages that are not deliverable to, for example, offline devices at the time that the messages are sent by one or more messaging servers. The messages are backed up through a synchronization process that transfers a batch of a plurality of messages rather than a single message or an entire database of messages. In one embodiment a conversation state is synchronized for each conversation first before synchronizing messages through the transfer of the one or more batches of messages.

A method according to one embodiment can include the following operations: storing, in a temporary storage, a first set of messages for one or more devices that use a messaging account in response to determining the first set of messages was not identified as received for any one of the one or more devices when the first set of messages are sent from a set of messaging servers that provide a messaging service, where the temporary storage is configured to store the first set of messages for a limited period of time; storing, in an archival storage for the messaging account, a second set of messages some of which were stored in the temporary storage for the messaging account and some of which were stored in the archival storage as a result of one or more synchronizations with any one of the one or more devices that use the messaging account, wherein the second set of messages provides a single backup copy for all of the one or more devices that use the messaging account. In one embodiment the method can further include: transferring, as part of a synchronization process between the archival storage and each of the one or more devices, a batch of messages which includes a plurality of messages up to a predetermined maximum number of messages in the batch, the transferring including at least one of receiving at the archival storage or transmitting from the archival storage; and moving at least some of the first messages, after the limited period of time for the first set of messages expires, to the archival storage. In one embodiment, the archival storage provides a truth zone storage backup as a single backup for all of the one or more devices that use the messaging account.

In one embodiment, the synchronization process can include transferring a conversation state for a conversation between a user of the one or more devices and another user of another device that uses the messaging service, where the conversation state is transferred before transferring the batch of messages. The transferring includes either receiving at the archival storage or transmitting from the archival storage or both in order to synchronize the conversation state. In one embodiment, the conversation state includes one or more of the following: (a) phone number or email address of each participant in the conversation; (b) group identifier for the participants in the conversation; (c) a last read timestamp indicating a time of sending of the last message in the conversation which was displayed; or (d) an optional a list of message record identifiers for at least a subset of the messages in the conversation.

In one embodiment, each message in the first set and second set of messages has a record identifier for use in removing or avoiding duplicate messages. In one embodiment, the record identifier can be unique relative to all other messages in the messaging account and can be the same across all of the one or more devices that use the messaging account, and this record identifier can be used to remove or avoid creating duplicate messages in the second set of messages which can be a single backup copy used for all of the one or more devices that use the messaging account.

In one embodiment, the archival storage can include a time tag that represents a point in time that messages were last synchronized between the archival storage and a first device of the one or more devices that use the messaging account, and this time tag can be used to indicate a starting point for a future synchronization with the first device that uses the messaging account. For example, when synchronization is performed in batches of messages, the synchronization can begin with messages sent or received after the time tag. Thus, in one embodiment the most recent messages presumably not seen by the user of the messaging account will be synchronized first through batches of messages.

In one embodiment, the synchronization of batches of messages occurs no more than a predetermined number of times during a day. For example, the predetermined number of times can be less than 12 times a day in one embodiment. In one embodiment, the synchronization of messages is repeated over a first interval of time and the synchronization of conversation state is repeated over a second interval of time that is different than the first interval of time. For example, the synchronization between a client device and the archival storage of the conversation state can occur more frequently than the synchronization of messages, in batches of messages, between the archival storage and the one or more client devices using the messaging account.

In one embodiment, the messaging account of a user includes a plurality of conversations between the user of the one or more devices and other users who use the messaging service and have their own messaging account.

In one embodiment, a client device that uses a messaging account can perform the following operations: retrieving, by a first device from temporary storage, a first set of messages for the first device in a set of devices that use a messaging account, wherein the retrieving is done if the first device was offline at the time that the first set of messages were sent or if the first set of messages was not identified as received by the first device; transferring data, as part of a synchronization process, between an archival storage storing a second set of messages in the messaging account and the first device, where the second set of messages provides a single backup copy for all devices that use the messaging account, and wherein the transferring includes receiving at the first device or transmitting from the first device or both. In one embodiment the method can further include: receiving one or more messages from a set of messaging servers contemporaneously with the time the messages were sent if the first device is online at the time the messages were sent.

In one embodiment, the method can further include: determining messages to mark as read in a set of conversations based upon a last read timestamp, the last read timestamp indicating, for each displayed conversation, a time of sending of the last message in the conversation; and marking the determined messages as read, wherein at least some of the messages marked as read are downloaded as part of the synchronization process after they were marked as read.

In one embodiment, the synchronization process can include synchronizing a conversation state for each conversation in the messaging account, and the conversation state can be synchronized before synchronizing messages through the transfer of one or more batches of messages. In one embodiment, each batch of messages includes a plurality of messages up to a predetermined maximum number of messages in the batch. In one embodiment, the conversation state which is synchronized can include one or more of the following: (a) phone number or email address of each participant in the conversation; (b) group identifier for the participants in the conversation; (c) the last read timestamp for the conversation; or (d) an optional list of message record identifiers for the messages in the conversation.

In one embodiment, each message in the first set and the second set of messages can be identified by a record identifier that is unique relative to all other messages in the messaging account and can be the same across all devices in the set of devices that use the messaging account. The record identifier for each message can be used to avoid duplication of messages in the archival storage which can serve as a single backup copy for all devices that use the messaging account.

In one embodiment the synchronization process can use a time tag that represents a point in time that messages were last synchronized between the archival storage and the first device in the set of devices that use the messaging account. This time tag can be stored with the messages on the archival storage. This time tag can indicate a beginning point for the next synchronization with the first device in the messaging account such that synchronization can begin with messages sent after the time tag and hence synchronization can begin with the most recent messages first before synchronizing older messages.

The methods and systems described herein can be implemented by data processing systems, such as one or more smartphones, tablet computers, desktop computers, laptop computers, smart watches, wearable devices, audio accessories, onboard computers, and other data processing systems and other consumer electronic devices. The methods and systems described herein can also be implemented by one or more data processing systems which execute executable computer program instructions, stored in one or more non-transitory machine readable media or medium that cause the one or more data processing systems to perform the one or more methods described herein when the program instructions are executed. Thus, the embodiments described herein can include methods, data processing systems, and non-transitory machine readable media such as DRAM memory and flash memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
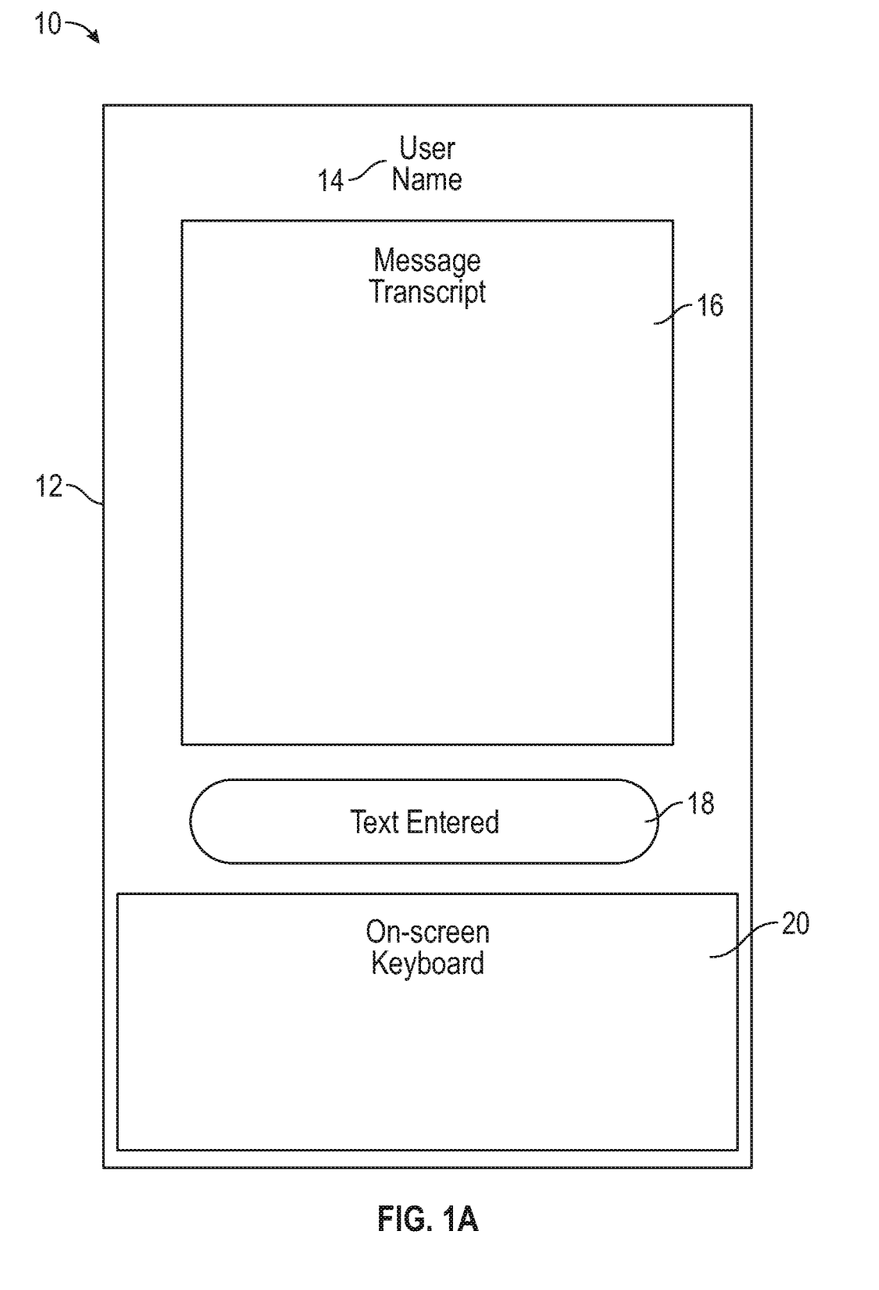
FIG. 1A shows an example of a user interface for a messaging application (app) on a communication device.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
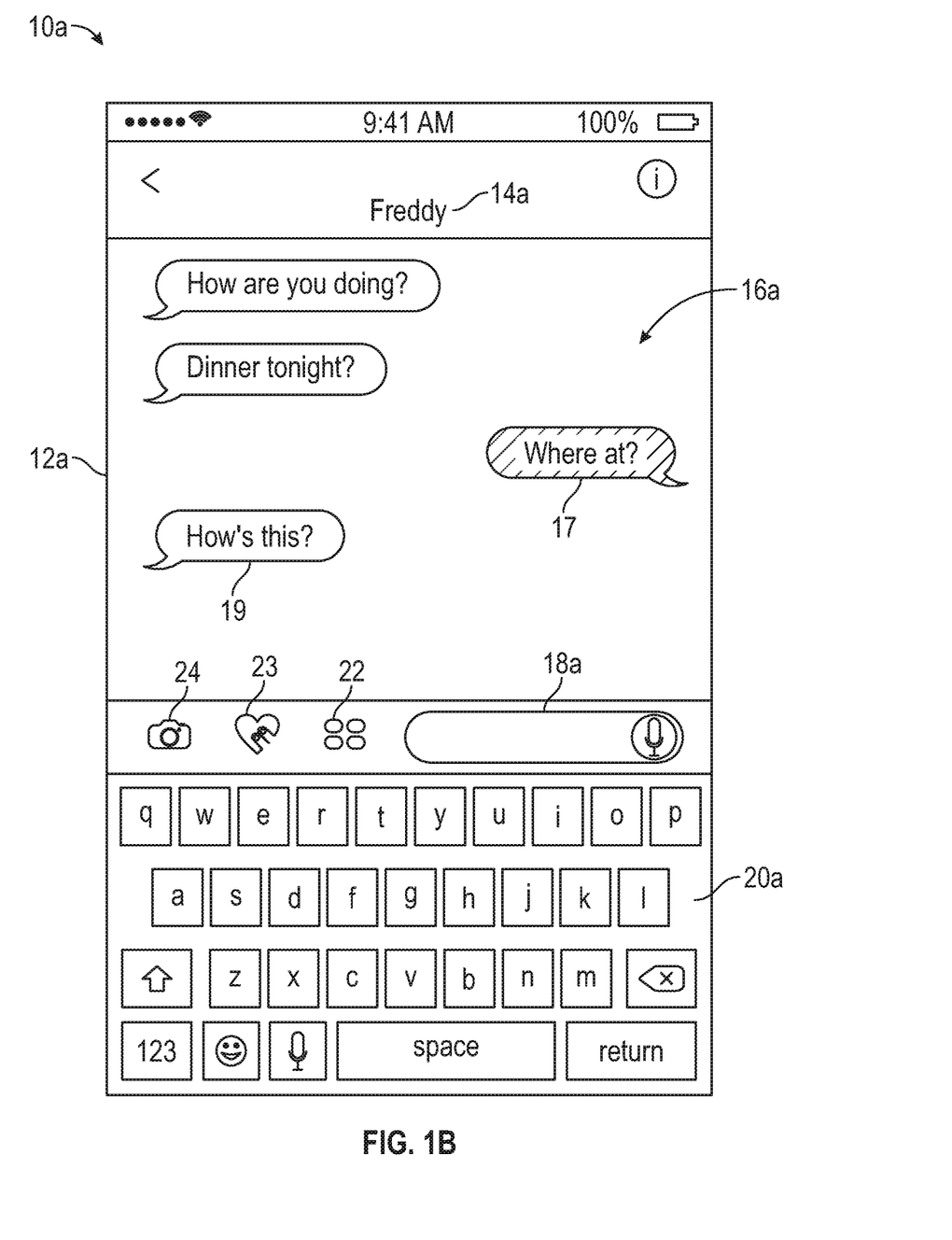
FIG. 1B shows another example of a user interface for a messaging app on a communication device.

FIG. 1B shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process. The camera app icon 24 in one embodiment can, when selected, cause the communication device 10A to enter into a camera mode in which a camera of a device can capture still images or video images which can be placed into the message in order to send the image or video.

Figure 2:
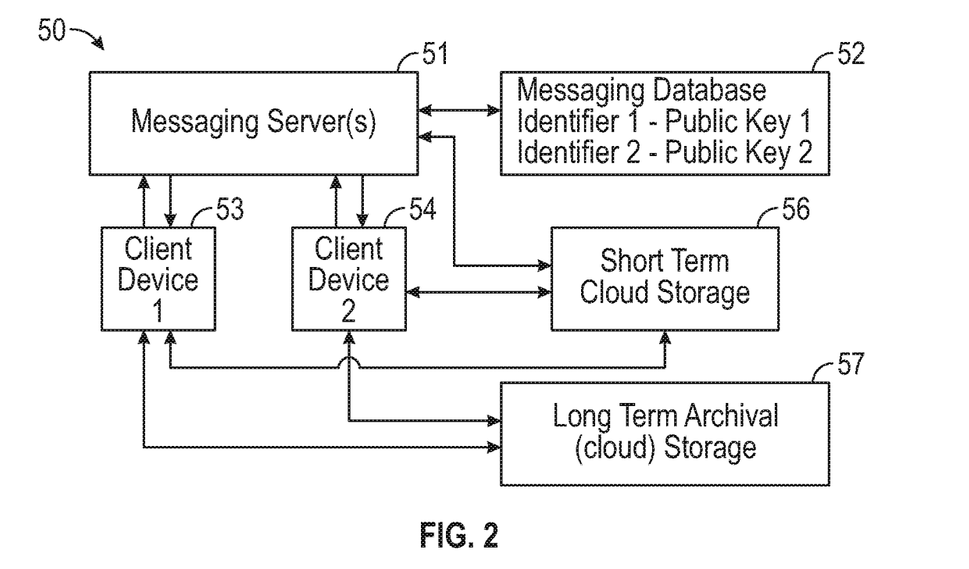
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with the messaging system. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

The short-term cloud storage 56 and the long-term archival cloud storage 57 can be part of a system that together both delivers messages and also synchronizes messages in each messaging account provided by the messaging system. Client device 53 can be one of several client devices (e.g., a smartphone and a laptop computer) that use a first messaging account (owned by a first user), and client device 54 can also be one of several client devices (e.g., a smartphone and a tablet computer) that use a second messaging account (owned by a second user). Both the first and the second messaging accounts are configured to operate in the messaging system with the message server(s) 51 so that messages (e.g., text messages, images, videos, etc.) can be sent to other client devices that have messaging accounts in the system. In one embodiment, the short-term cloud storage 56 can be temporary storage that is used to store messages, for a period of time (e.g., based on a time-to-live TTL value), and when the TTL expires then the messages can optionally be moved to the long-term archival (cloud) storage. The short-term cloud storage 56 can be used to store messages that were sent to be delivered to devices in a messaging account that were, for example, offline at the time the messages were sent; hence the one or more messaging servers can deliver one or more messages to the short-term cloud storage 56 for such offline devices, and the short-term cloud storage 56 can transmit those messages (before the TTL of those messages expire) to the devices that were offline when they come back online. An attempted delivery of a message to an offline device will cause the messaging system to determine that the message was not identified as received by the offline device; this is typically caused by an absence of an acknowledgement of receipt from the offline device. In some instances, a device may be online but the message still does not get delivered or indicated as received, and hence the messaging system will identify the message as not received even though the device was online. In one embodiment, the short-term cloud storage 56 can be implemented as a set of servers and can be similar to the temporary storage 916 in FIG. 3 or the temporary storage 477 in FIG. 5B. In one embodiment, the short-term cloud storage 56 is configured to be able to transmit messages to previously offline devices that return back online, which can happen with both client devices 53 and 54. In one embodiment, the short-term cloud storage can be configured to store all messages even if a message was received by all devices that use a messaging account. The long-term archival (cloud) storage 57 can be used to store a truth zone of messages that is used to synchronize with one or more devices of each messaging account, and this synchronization can use the truth zone on the archival storage for each messaging account as the single backup copy of messages for each messaging account. In one embodiment, the long-term archival (cloud) storage 57 can be implemented by a set of servers and can be similar to the archival storage 926 in FIG. 3 or the archival storage 451 in FIG. 5A or the archival storage 479 in FIG. 5B.

Figure 3:
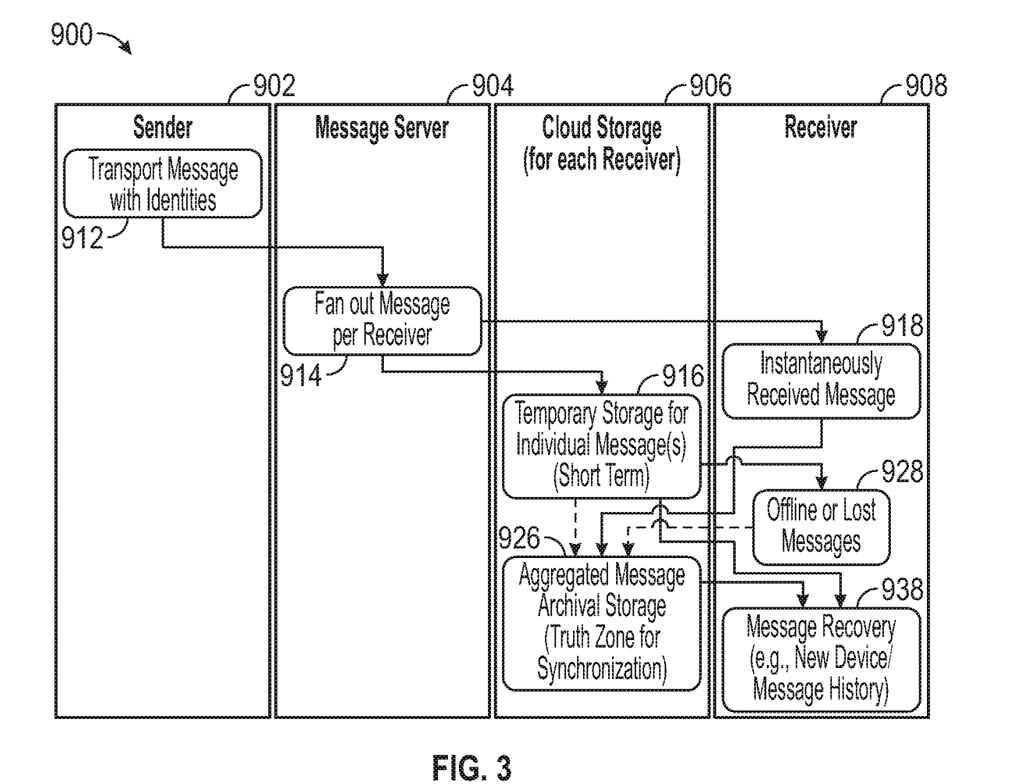
FIG. 3 illustrates messaging within a cloud-based messaging system for sending and receiving messages according to one or more embodiments described herein.

FIG. 3 illustrates messaging within a cloud-based messaging system 900 for sending and receiving encrypted messages, according to an embodiment. The cloud-based messaging system 900 includes a sender 902, message server 904, cloud storage 906 for each receiver, and a receiver 908. The sender 902 and receiver 908 are client devices of the cloud-based messaging system 900. One or more infrastructure servers of the cloud-based messaging system 900 can provide the message server 904 and cloud storage 906. The cloud storage 906 can be segregated into zones for each receiver, such as receiver 908; for example, cloud storage 906 for receiver 908 can include a transport zone to store the message in short-term (e.g., less than 30 days) storage and a truth zone that can be a permanent (long-term) truth zone that is used to synchronize to multiple devices associated with receiver 908.

The sender 902 can encrypt message content (msg) from a user and perform a transport operation 912 to the message server 904 to send the encrypted message and associated identities associated with the message. The message server 904 can, in one embodiment, perform a fan out operation 914 to send the message to each message receiver. The fan out operation 914 can include directly sending the message to the receiver 908 if the receiver is online (instantaneously received message 918). In one embodiment, the fan out operation 914 can use one or more push notification servers to push the message to each receiver that is currently online.

If the receiver 908 is offline, the message server 904 can temporarily store the message in cloud storage 906 associated with the receiver 908. The message server 904 can store the message (and optionally any attachments in one embodiment) as an individual message in a short-term message storage zone of cloud storage associated with the user (such as temporary storage 916). If the receiver 908 was offline at the time the message was sent or the message was lost in transit, the receiver 908 can receive the message later as an offline message (offline or lost messages 928) from the temporary storage 916.

The instantaneously received message 918 can be stored in the cloud storage 906 of the receiver during a backup process (through the synchronization processes described below) which can store the message in an archive (such as the archival storage 926 for the messaging account). The messages can be stored in a long-term message archive 926 on the cloud storage which can be in a "truth" zone for the cloud storage associated with each receiver, and this zone provides storage for data that is treated as correct and true so it can be used to restore or recover a previously used device or to initialize a new device of the user of the cloud storage account or to synchronize messages with existing devices of the account. In one embodiment, the offline or lost messages 928 from a receiver 908 are also backed up to the long-term message archive 926 during the backup. In one embodiment, the individual messages 916 stored in short-term storage can be stored to the long-term message archive 926 as the messages expire from short-term storage and de-duplication methods described below can be used. Message recovery 938 on a receiver 908 can be performed from the individual messages 916 as well as the long-term message archive 926. Message recovery 938 can be performed when restoring a device from backup, adding a new device to an account, or to access an account message history.

Figure 5A:
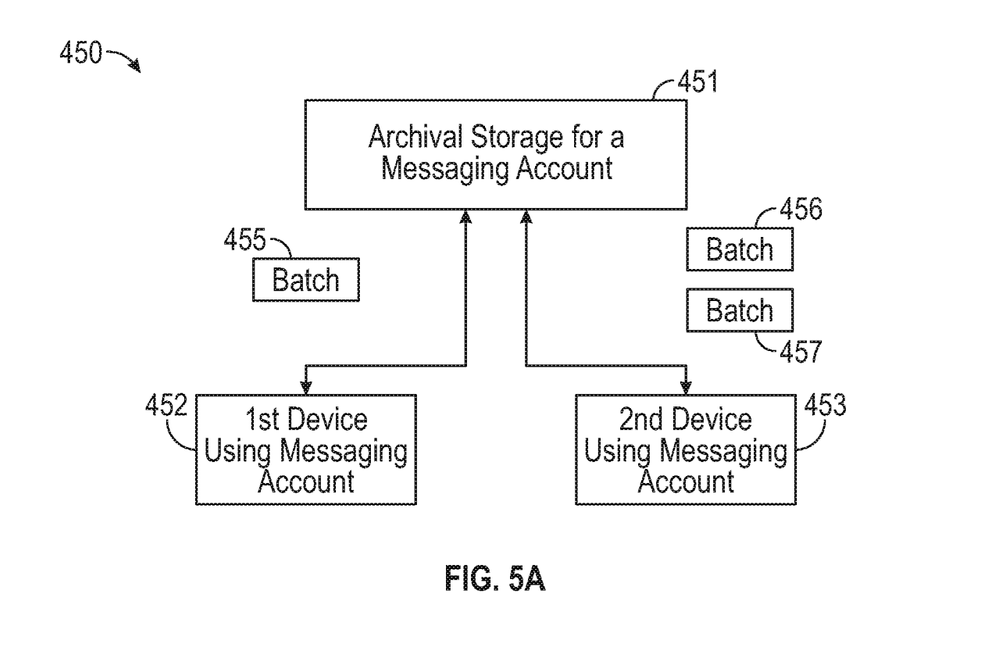
FIG. 5A shows an example of how two client devices (which use the same messaging account) synchronize separately through batches of messages with an archival storage according to one or more embodiments described herein.
Figure 5B:
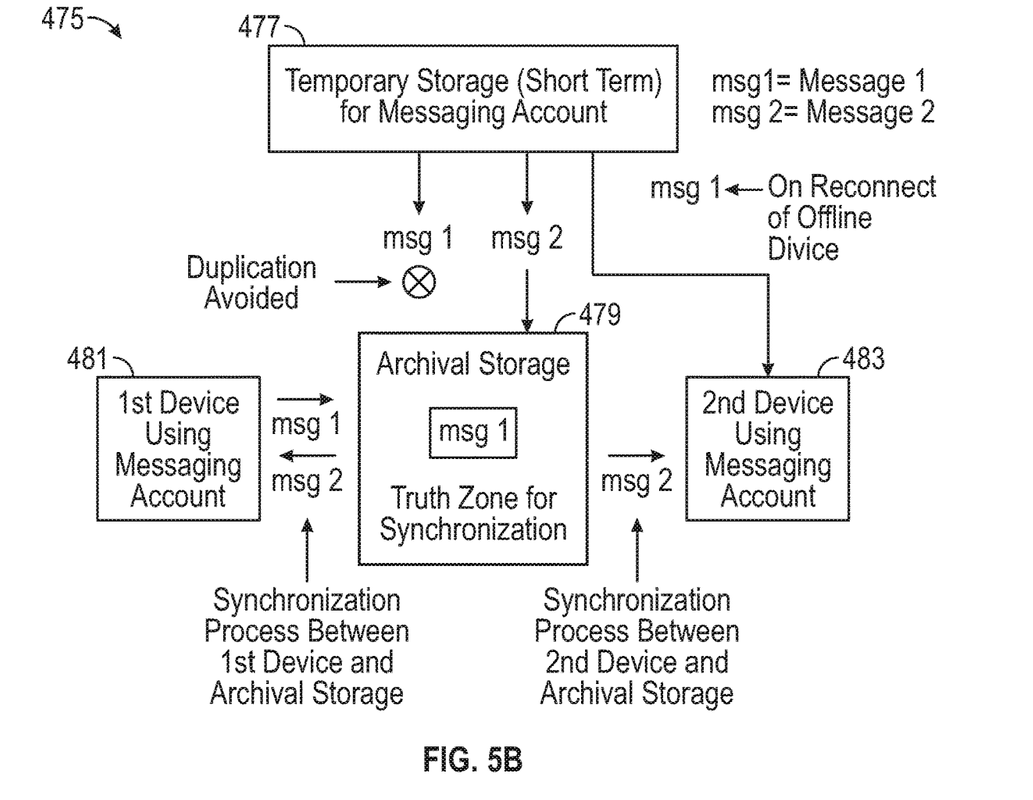
FIG. 5B shows the interaction by two client devices that use the same messaging account with both temporary storage and archival storage according to one or more embodiments described herein.
Figure 6:
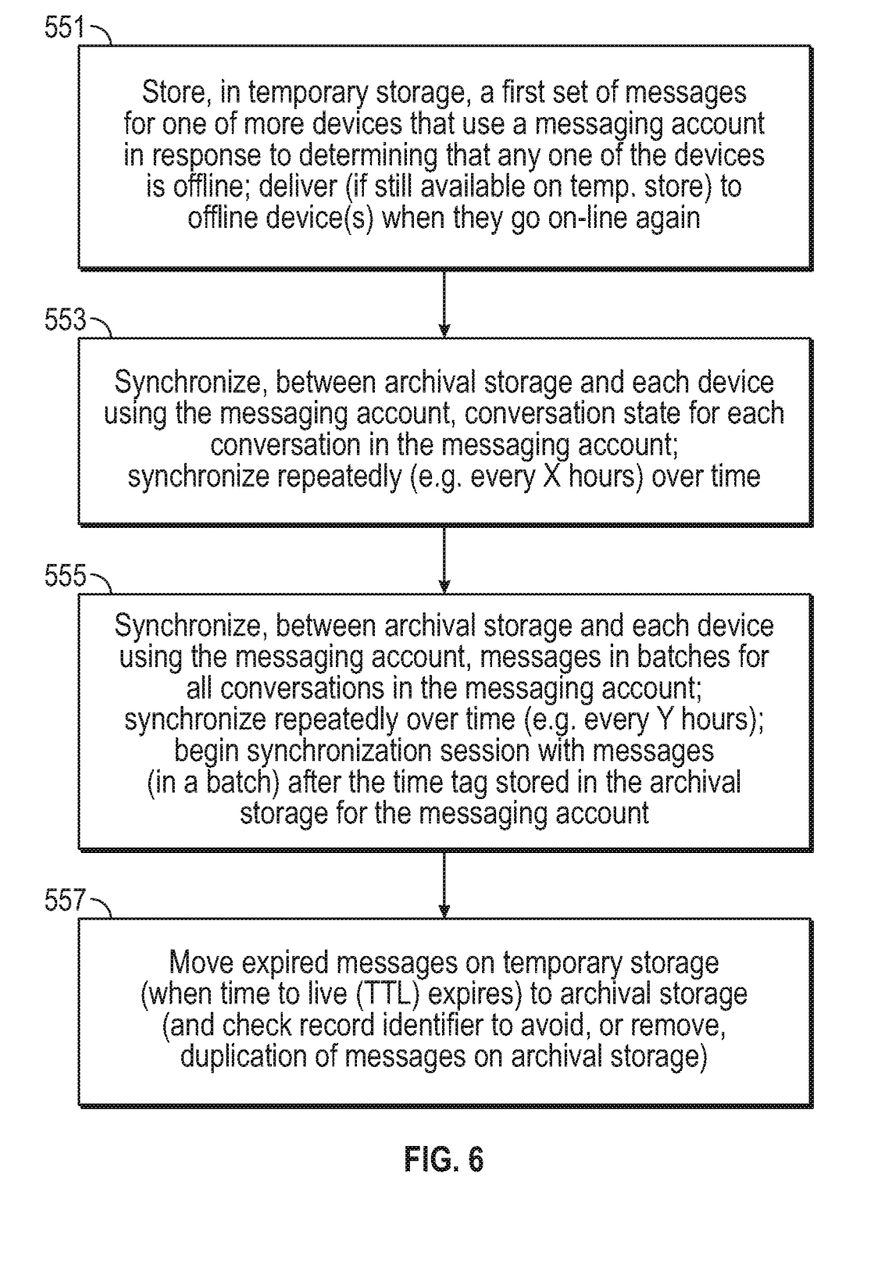
FIG. 6 shows an example of a method which can be performed by a cloud storage system which can include both a temporary storage and an archival storage.

FIG. 6 shows an example of a method that can be performed by a cloud storage system that can be part of a messaging service for a plurality of messaging accounts. Typically, each user can set up a messaging account and use a plurality of different devices (such as a smartphone and a laptop computer) to send and receive messages using the messaging account that is owned by the user. The cloud storage system can be used to deliver messages (for example, to previously offline devices in a messaging account) and to provide a single backup copy (in archival storage) of all messages sent and received in the messaging account. The cloud storage system can include both the temporary storage and the archival storage. Examples of the temporary storage include temporary storage 916 in FIG. 3 and temporary storage 447 in FIG. 5B and short-term cloud storage 56 in FIG. 2. Examples of the archival storage include archival storage 926 in FIG. 3, archival storage 57 in FIG. 2, archival storage 451 in FIG. 5A and archival storage 479 in FIG. 5B. Referring now to FIG. 6, a method can begin in operation 551 by storing, in the temporary storage, a first set of messages for one or more devices that use a messaging account in response to determining that, for example, any one of the devices is offline (or if a device was online, the acknowledgement of receipt from the device was not sent or not received). An example of this storage is shown in FIG. 3 by the arrow which points to the temporary storage 916. In one embodiment, the one or more messaging servers (that send a message to one or more receiver devices) can determine whether acknowledgement(s) of receipt have been received from each receiver device. This acknowledgement ("ack") of receipt can be sent by each receiver device as a delivery status message. If the acknowledgment fails to be received by the messaging servers(s), the messaging server(s) is configured to retry sending the message twice (in one embodiment). If no acknowledgment of receipt is received after the retries, the messaging server(s) causes the message (for which no ack was received from the receiver device) to be stored in temporary storage for that receiver device.

The operation 551 in FIG. 6 can also include delivering the first set of messages to one or more devices that use a messaging account when those devices which were offline go back online again. An example of the delivery of such messages is shown in FIG. 3 by the arrow from temporary storage 916 to the block "offline or lost messages" 928. Another example of the delivery of messages to devices that were offline is shown in FIG. 5B by the transmission of the message labeled msg1 from the temporary storage 477 to the second device 483. In one embodiment, the delivery of messages in the temporary storage can be configured to be very quick once the cloud storage system receives notice of the presence of the device that was offline when the first set of messages was sent. Thus, such devices that were offline at one point and are back online again can quickly obtain messages in the messaging account from the temporary storage.

Figure 4:
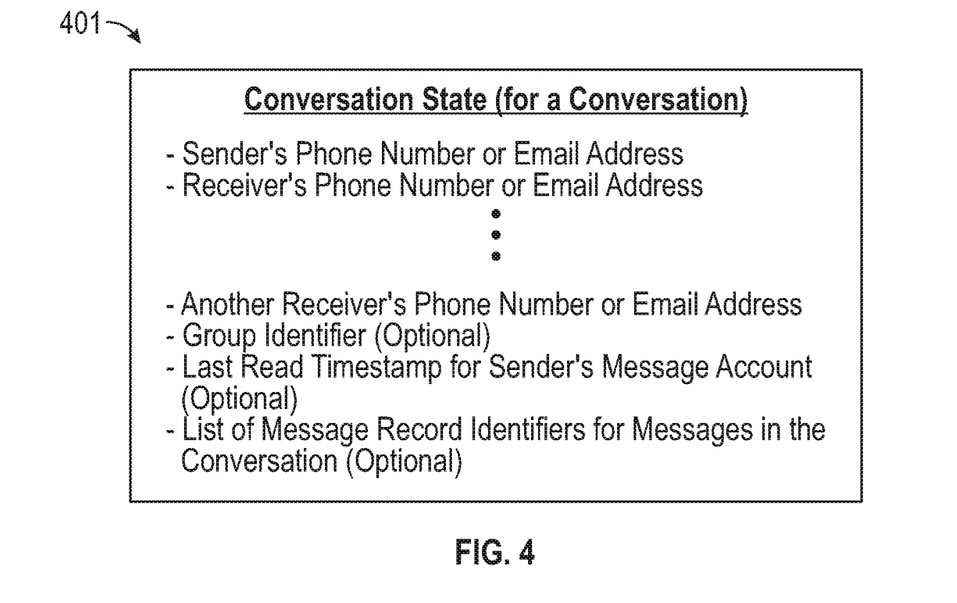
FIG. 4 shows an example of a conversation state which can be synchronized between a client device that uses a messaging account and an archival storage that provides a single backup copy for all client devices that use the messaging account.

In operation 553 of FIG. 6, the archival storage can perform a synchronization process with each client device using the messaging account. In operation 553, the synchronization process involves synchronizing the conversation state for each conversation in the messaging account. In one embodiment, this synchronization can occur repeatedly over time such as every two hours or every four hours, etc. Synchronization can also occur in response to an event or events such as the client device detecting that it went offline and then came back online again, and hence synchronization can also occur when this sequence is detected. FIG. 4 shows an example of a conversation state 401 that can be synchronized between the archival storage and each device using the messaging account. In one embodiment, the conversation state can include for each conversation: the sender's phone number or email address; a first receiver's phone number or email address; phone numbers or email addresses for other receivers; an optional group identifier; an optional last read timestamp for the sender's message account; and an optional list of message record identifiers for messages in the conversation. In one embodiment, the conversation state, such as conversation state 401 does not include content within the messages that are sent in the messaging account or messages that are received in the messaging account. In one embodiment, the last read timestamp can be used as described in operation 581 in the method shown in FIG. 7.

Referring back to FIG. 6, in operation 555 the archival storage synchronizes messages in batches for all conversations in the messaging account for each device that uses the messaging account. In one embodiment, the batches of messages include a plurality of messages up to a predetermined maximum limit for the number of messages. In one embodiment, the predetermined maximum limit can be 200 messages. In one embodiment, the archival storage can provide a single backup of all of the messages sent and received in the messaging account for all devices that use the messaging account. For example, if a user has a smartphone, a tablet computer, and a laptop computer, all three of those devices can use the messaging account to send messages and to receive messages and all of the messages for all three devices can be backed up through a synchronization process or repeated synchronization processes over time onto a single backup in the archival storage for the messaging account rather than having separate backups for each device. In one embodiment, the synchronization can be performed repeatedly over time such as every 24 hours or every 12 hours, and the batches of messages can be sent in both directions between the client device being synchronized and the archival storage for the messaging account that the client device uses. In one embodiment, a synchronization session can begin with the transfer of messages between the archival storage and the client device being synchronized (in batches) after a time tag stored on the archival storage for the client device that uses the messaging account. In one embodiment, the archival storage can store a time tag that represents a point in time that messages were last synchronized between the archival storage and a first device that uses the messaging account. For example, if the user uses three devices to send and receive messages using the messaging account, each device that was last synchronized to the archival storage can cause the archival storage to record a time tag for that device that represents the point in time that the device performed the last or most recent synchronization with the archival storage. In one embodiment, the synchronization process in operation 555 of FIG. 6 can use the time tag so that the initial stages of the synchronization session begin by synchronizing messages sent or received after the time tag stored by the archival storage for the messaging account being synchronized. Hence, using this feature, an embodiment can synchronize the most recent messages after the last synchronization and then resume synchronization of changes that may have occurred prior to the time tag. FIG. 5A shows an example of a synchronization process between two different client devices that use the same messaging account and an archival storage for the messaging account. The synchronization occurs in batches of messages as in operation 555 of FIG. 6 and the synchronization occurs between each client device and the archival storage for the messaging account of the client device. In the system 450 shown in FIG. 5A, the first client device 452 sends and/or receives a batch 455 which is transferred between the archival storage 451 and the first client device 452. The second client device 453 (which uses the same messaging account as the first client device 452) sends or receives two batches of messages 456 and 457 which are transferred between archival storage 451 and the second client device 453. The archival storage 451 can use the time tag referred to in operation 555 of FIG. 6 in one embodiment. It will be appreciated that the synchronization process can utilize well-known synchronization techniques for reconciling differences between messages in a client device and messages in the archival storage. This can include the use of change identifiers or synchronization anchors or other techniques known in the art for performing a synchronization process between a client device and a server system which can implement the archival storage for a messaging account. The system shown in FIG. 5A requires that messages be sent in batches in one embodiment rather than one by one. Moreover, the system shown in FIG. 5A does not attempt to synchronize a large database of messages by transferring the database between a client device and the archival storage. It will be appreciated that, in one embodiment, a synchronization process between a first client device using a messaging account is separate and distinct from another synchronization process between the archival storage and another device using the same messaging account. In one embodiment, the archival storage maintains a truth zone for all messages in the messaging account for all of a user's client devices that use the messaging account.

Referring back to FIG. 6, in optional operation 557, the temporary storage, such as temporary storage 477 shown in FIG. 5B can move expired messages from the temporary storage to the archival storage. This can be done when the message's time-to-live (TTL) expires. In one embodiment, each of the messages stored on the temporary storage can have a time-to-live, and when the TTL expires, the messages with expired TTL's can optionally be moved from the temporary storage, such as temporary storage 477 onto an archival storage for the messaging account such as archival storage 479. Either during the process of the move or after the move, the archival storage can check for duplicate records and prevent the message from being stored in the archival storage for the messaging account; alternatively, the archival storage can merely store moved messages and then perform de-duplication operations based upon record identifiers for each message. In one embodiment, a record identifier can be a unique identifier relative to all other messages in the messaging account but can be the same identifier across all of the devices that use the messaging account for the particular message. In other words, each message can have a unique identifier but that identifier is used for that message across all of the devices that use the messaging account. The record identifier can also be used during the synchronization processes to avoid duplicating messages.

FIG. 5B will now be referred to while describing various aspects such as de-duplication. The temporary storage 477 can be similar to the temporary storage 916 shown in FIG. 3 and the short-term cloud storage 56 shown in FIG. 2. Temporary storage 477 can be used to deliver messages to client devices that were offline when the messages were sent. When a previously offline client device reconnects, the temporary storage 477 can receive information indicating the presence of the previously offline device on a network and cause the transmission of messages stored on the temporary storage 477 so that they can be provided when the previously offline device reconnects. This is shown by the delivery of message 1 to the second client device 483 which is using the same messaging account as client device 481. In one embodiment, the same user can use both the first client device 481 and the second client device 483 to send and receive messages in the same messaging account. For example, the same user can use the user's smartphone to send and receive messages in the messaging account while also using a laptop computer to send and receive messages in the same messaging account which is used by the same user in this example. In the example shown in FIG. 5B, the first client device 481 receives message 1 when that message is sent, and hence the first client device does not obtain message 1 from the temporary storage 477. This is similar to how receiver 908 instantaneously receives message 918 shown in FIG. 3. Thus, an optional move by temporary storage 477 when message 1 expires is stopped or discarded by a de-duplication process so that a duplicate of message 1 is not stored in the archival storage 479. The record identifier for message 1 can be used to avoid duplication or remove duplication. Message 2 on the other hand in the example shown in FIG. 5B was never delivered, in one embodiment, to either the first client device or the second client device when message 2 was initially sent. Moreover, temporary storage 477 did not successfully transmit message 2 to either the first client device 481 or the second client device 483. After message 2 is optionally moved from temporary storage 477 when it expires to the archival storage 479, message 2 can then be provided to both the first client device 481 and the second client device 483 through two separate synchronization processes shown in FIG. 5B. In the example shown in FIG. 5B, message 1 is provided to the archival storage 479 by a first synchronization process between the first client device 481 and the archival storage 479. Either in that same synchronization process or in a later synchronization process, the first client device 481 receives message 2 from the archival storage, where message 2 originated from the temporary storage 477. In the example shown in FIG. 5B, message 1 is provided by the first client device 481 to the archival storage before the temporary storage 477 attempts to move message 1 from the temporary storage to the archival storage 479. As shown by a second synchronization process between the second client device 483 and the archival storage 479, message 2 is provided as part of a synchronization process to the second client device 483. After all of these synchronization processes are completed, both the first and the second client devices can contain an up-to-date copy of all of the messages sent and received by virtue of the archival storage 479 acting as a truth zone for the synchronization processes. It will be appreciated that the transfer of messages during the synchronization processes can use batches of messages in which there are more than one message in each batch and the batch is limited by a predetermined maximum limit. In one embodiment, the batches can have up to 200 messages that are transferred between the client device and the archival storage during a synchronization process.

Figure 7:
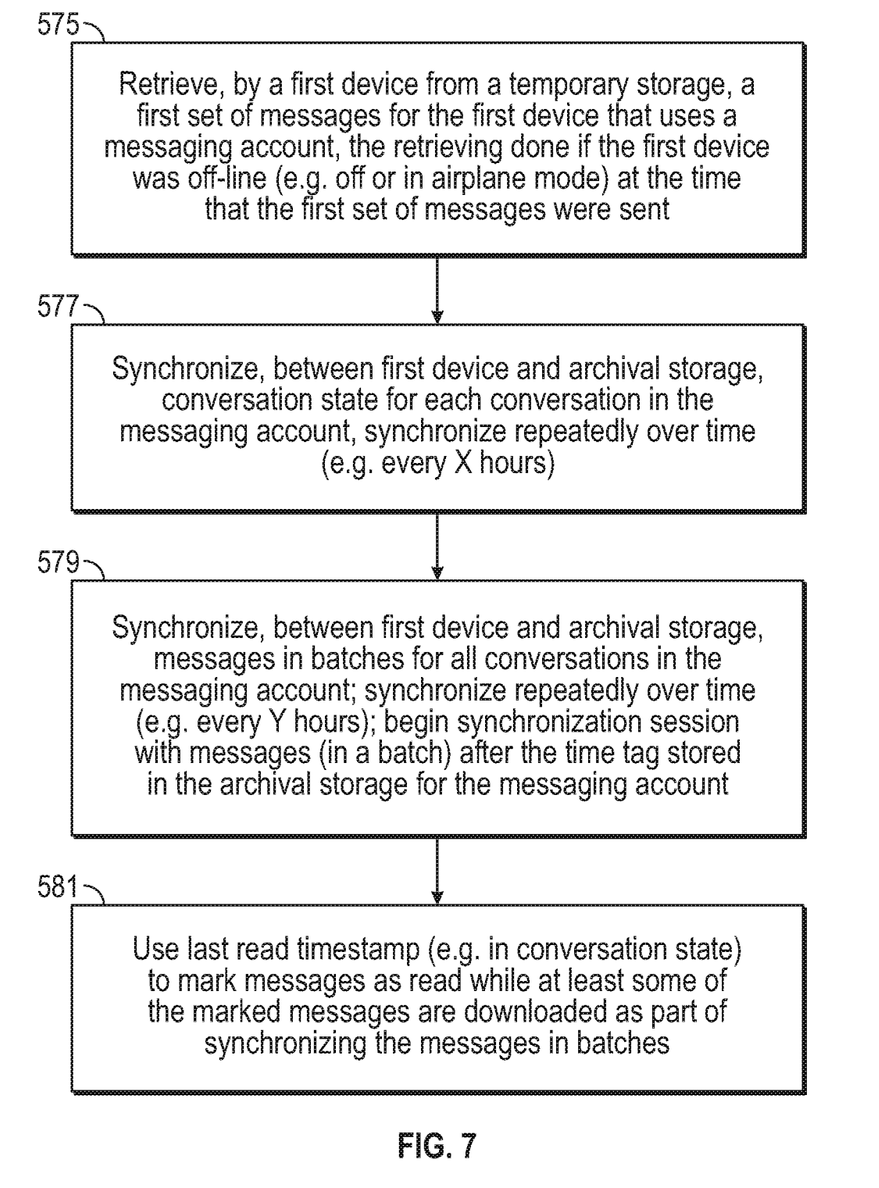
FIG. 7 shows an example of a method which can be performed by a first client device which can interact with both the temporary storage and the archival storage to both receive messages and back up messages to, for example, the archival storage.

FIG. 7 will now be referred to while describing one or more methods that can be performed by a client device according to one or more embodiments described herein. In operation 575 of FIG. 7, a client device can retrieve from a temporary storage, a first set of messages for the first client device that uses a messaging account, where the retrieving is done if, for example, the first client device was offline (such as in an airplane mode or off) at the time that the first set of messages were sent. In one embodiment, the first client device can cause a presence signal to indicate the presence of the client device in a network which causes the transmission of the first set of messages from the temporary storage in operation 575, thereby allowing retrieval of the first set of messages through the temporary storage. In one embodiment, this is shown by the arrow from temporary storage 916 to block 928 in FIG. 3. The delivery of messages from the temporary storage can provide in one embodiment those messages faster than through a synchronization process with an archival storage which operates as a truth zone for synchronization with the client device. In operation 577 of FIG. 7, the first client device and the archival storage can synchronize a conversation state for each conversation in the messaging account. This synchronization of the conversation state can occur repeatedly over time, such as every four hours, and the interval of repetition for synchronization of the conversation state can be different than the interval of repetition of the synchronization in batches of messages which occurs in operation 579. In operation 579, the first client device and the archival storage can synchronize messages in batches for all conversations in the messaging account. This synchronization of messages through batches can repeat over time such as every 12 hours or every 24 hours, etc. In one embodiment, the synchronization session of messages in batches can begin after the time tag stored in the archival storage for a device that uses the messaging account. This can cause the most recent messages to be synchronized first and then messages sent or received prior to the time tag can be synchronized next. The method according to FIG. 7 can also include operation 581 which can use a last read timestamp to mark messages as read, and this marking of the messages can occur while at least some of the marked messages are being downloaded as part of a synchronization of messages in batches. In one embodiment of operation 581, the first client device can use the last read timestamp which is in the conversation state to determine which messages to mark as read in a set of conversations. The last read timestamp in one embodiment indicates, for each displayed conversation, a time associated with the last message in the conversation such as a time of sending the last message. The client device can then mark the messages which were determined to have been read as being read, and this can occur while the client device continues to download or send messages in batches as part of a synchronization process which synchronizes messages between the client device and the archival storage.

Figure 5C:
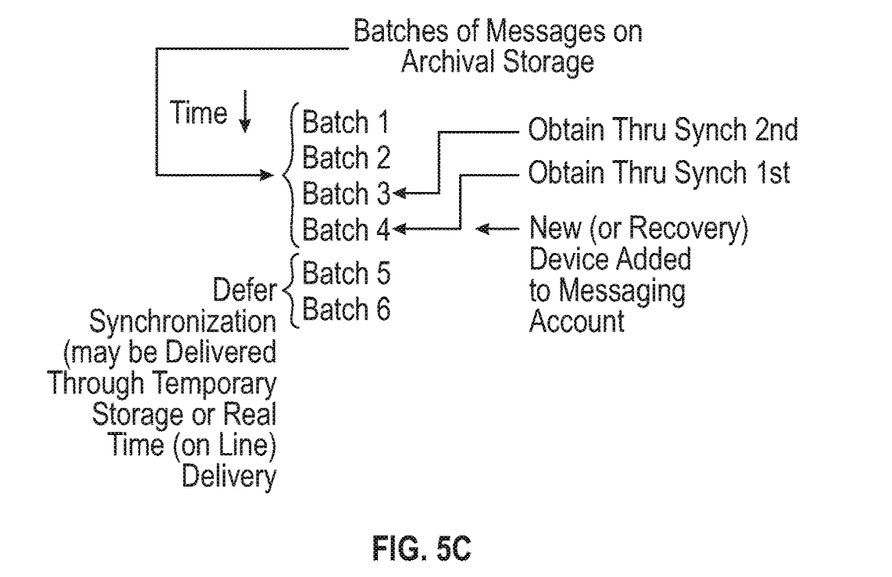
FIG. 5C shows an example of how a new client device can synchronize through batches with an archival storage to provide a fast bring up of the new device or a fast recovery of an old device that was erased.

FIG. 5C will now be referred to while describing an embodiment which allows for the fast bring up of a new device or a fast bring up of an old device that was erased and is now being recovered through the bring up process which includes synchronization through batches of messages on an archival storage. In the example shown in FIG. 5C, the user of the messaging account obtains a new device around the time that batch 4 was stored on archival storage for the messaging account. As shown in FIG. 5C, batch 1 is the first in time, batch 2 is the second in time, batch 3 is the third in time and batch 4 is the fourth in time on the archival storage. Hence, batch 1 contains the oldest messages while batch 4 contains messages that are more recent than messages in batch 3. Similarly, batch 3 contains messages that are more recent than messages in batch 2. Batches 5 and 6 have messages received or sent after the messages in batch 4, but messages in batches 5 and 6 will be deferred as further explained below. When the new device connects for synchronization with the archival storage, it begins the synchronization process with batch 4 (which may be 10 days ago, for example) and proceeds in reverse chronological order such that batch 4 messages are synchronized first, and then batch 3 messages are synchronized next, and then batch 2 messages are synchronized next, and lastly messages in batch 1 are synchronized last. These synchronization processes for batches 1 through batch 4 are all performed before attempting to synchronize messages in batch 5. The messages in batch 5 and batch 6 in at least some embodiments can be delivered through temporary storage or real-time online delivery so that synchronization may not be necessary for messages in batches 5 and 6. In this example, the new device or the device being recovered can select a point in time and begin the reverse chronology synchronization process from that given point in time. In those implementations in which the temporary storage can last for weeks, deferring synchronization of the two most recent batches as shown in FIG. 5C can still allow the new device to quickly bring up a history of the messages because the delivery through the temporary storage is often relatively fast. The method shown in FIG. 5C may be performed whenever the archival storage recognizes that the device is new or is being recovered; the method shown in FIG. 5C may not be desirable to use on existing devices which already have stored messages from prior synchronizations such as synchronizations in operations 555 of FIG. 6 and 579 of FIG. 7.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, tablet computers, smartphones, cellular telephones, personal digital assistants (PDAs), embedded electronic devices, or other consumer electronic devices.

Figure 8:
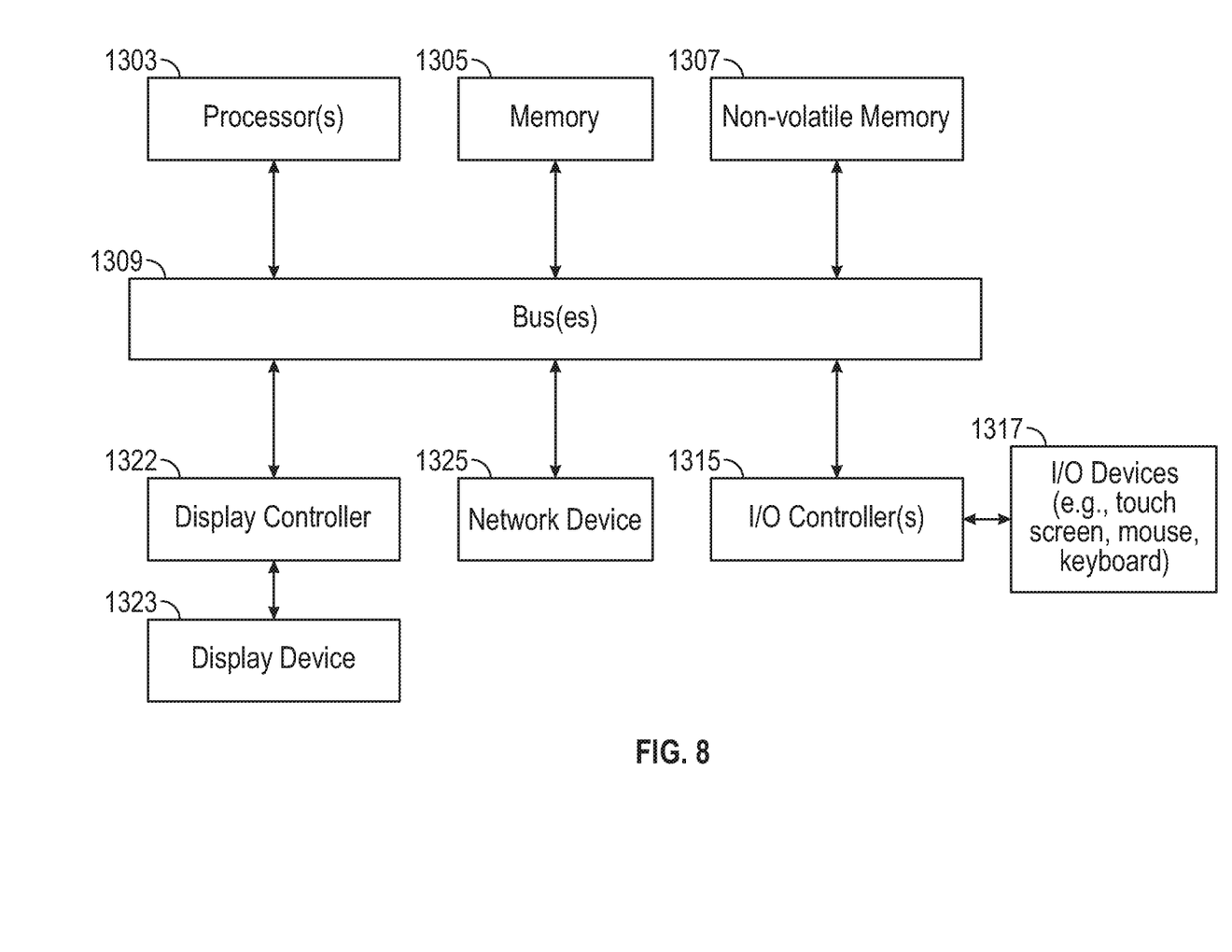
FIG. 8 shows an example of a data processing system which can be used to implement the devices and servers described herein.

FIG. 8 is a block diagram of data processing system hardware according to an embodiment. Note that while FIG. 8 illustrates the various components of a data processing system that may be incorporated into a mobile or handheld device or other electronic device, it is not intended to represent any particular architecture or manner of interconnecting the components as such details are not germane to the present invention. It will also be appreciated that other types of data processing systems that have fewer components than shown or more components than shown in FIG. 8 can also be used with the present invention.

As shown in FIG. 8, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems (e.g., ROM) that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 8 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method comprising:
   receiving, by a temporary storage server and from a set of messaging servers, a first set of messages for one or more devices that use a messaging account in response to determining the first set of messages was not identified as received for at least one of the one or more devices when the first set of messages are sent from the set of messaging servers;
   attempting, by the temporary storage server, to deliver the first set of messages to the at least one of the one or more devices for a delivery time period corresponding to the first set of messages; and
   transmitting, from the temporary storage server and to an archival storage server for the messaging account, at least one message of the first set of messages that was not identified as received for the at least one of the one or more devices within the delivery time period.

2. The non-transitory machine readable medium of claim 1, wherein the archival storage server synchronizes a second set of messages with the one or more devices that use the messaging account and the archival storage server provides a truth zone storage backup for all of the one or more devices that use the messaging account.

3. The non-transitory machine readable medium of claim 2, wherein the archival storage server synchronizes a conversation state for a conversation between a user of the one or more devices and another user of another device that uses a messaging service provided by the set of messaging servers.

4. The non-transitory machine readable medium of claim wherein the conversation state includes one or more of the following: (a) phone number or email address of each participant in the conversation; (b) group identifier for participants in the conversation; (c) a last read timestamp indicating a time when the conversation was last displayed on any one of the one or more devices; or (d) optionally a list of message record identifiers for at least a subset of messages in the conversation.

5. The non-transitory machine readable medium of claim 4, wherein each message in the first set and second set of messages has a record identifier for use in removing or avoiding duplicate messages.

6. The non-transitory machine readable medium of claim 4, wherein each message in the first and second set of messages is identified by a record identifier that is unique relative to all other messages in the messaging account and is the same across all of the one or more devices that use the messaging account, the record identifier used to remove or avoid creating duplicate messages in the second set of messages.

7. The non-transitory machine readable medium of claim 6, wherein the archival storage server includes a time tag that represents a point in time that messages were last synchronized between the archival storage server and a first device of the one or more devices that use the messaging account, and wherein synchronization, in batch after batch of messages, begins with messages after the time tag for the first device.

8. The non-transitory machine readable medium of claim 7, wherein synchronization of batches of messages occurs no more than a predetermined number of times during a day.

9. The non-transitory machine readable medium of claim 8, wherein synchronization of messages is repeated over a first interval of time and synchronization of conversation state is repeated over a second interval of time that is different than the first interval of time.

10. The non-transitory machine readable medium of claim 8, wherein the messaging account includes a plurality of conversations between the user of one or more devices and other users who use the messaging service and have their own messaging account.

11. A method comprising:
receiving, by a temporary storage server and from a set of messaging servers, a first set of messages for a first device in a set of devices that use a messaging account, in response to a determination that the first set of messages was not identified as received by the first device at a time that the first set of messages was sent by the set of messaging servers;
attempting, by the temporary storage server, to deliver the first set of messages to the first device for a delivery time period corresponding to the first set of messages; and
transferring, from the temporary storage server to an archival storage server storing a second set of messages in the messaging account, at least one of the first set of messages that was not identified as received for the first device within the delivery time period.

12. The method of claim 11, wherein the first device was offline at the time that the first set of messages was sent.

13. The method of claim 12, wherein the archival storage server is configured to perform a synchronization process to synchronize messages received at the first device.

14. The method of claim 13, wherein the synchronization process includes synchronizing a conversation state for a conversation, the conversation state is synchronized before synchronizing messages through transfer of a batch of messages.

15. The method of claim 14, wherein the batch of messages includes a plurality of messages up to a predetermined maximum number of messages in the batch of messages.

16. The method of claim 15, wherein the conversation state includes one or more of the following: (a) phone number or email address of each participant in the conversation; (b) group identifier for participants in the conversation; (c) a last read timestamp for the conversation; or (d) optionally a list of message record identifiers for the messages in a conversation.

17. The method of claim 15, wherein each message in the first set and the second set of messages is identified by a record identifier that is unique relative to all other messages in the messaging account and is the same across all devices in the set of devices.

18. The method of claim 17, wherein the record identifier for each message is used to avoid duplication of messages.

19. The method of claim 17, wherein the synchronization process uses a time tag that represents a point in time that messages were last synchronized between the archival storage server and the first device in the set of devices, and wherein synchronization with the first device begins with messages after the time tag.

20. The method of claim 19, wherein synchronization of batches of messages occurs no more than 12 times during a day.

21. A device comprising:
a memory; and
at least one processor configured to:
receive, from a set of messaging servers, a first set of messages for one or more devices that use a messaging account in response to determining the first set of messages was not identified as received for at least one of the one or more devices when the first set of messages are sent from the set of messaging servers;
attempt to deliver the first set of messages to the at least one of the one or more devices for a delivery time period corresponding to the first set of messages; and
transmit, to an archival storage server for the messaging account, at least one message of the first set of messages that was not identified as received for the at least one of the one or more devices within the delivery time period.

* * * * *

UNITED STATES PATENT AND TRADEMARK OFFICE
CERTIFICATE OF CORRECTION

| | | |
|---|---|---|
| PATENT NO. | : 10,742,732 B1 | Page 1 of 1 |
| APPLICATION NO. | : 15/902495 | |
| DATED | : August 11, 2020 | |
| INVENTOR(S) | : Kevin J. Lindeman | |

It is certified that error appears in the above-identified patent and that said Letters Patent is hereby corrected as shown below:

In the Claims

Column 16, Line 33 Claim 4, INSERT --3,-- after "claim";

Column 17, Line 5 Claim 10, INSERT --the-- after "of".

Signed and Sealed this
Twenty-second Day of September, 2020

Andrei Iancu
*Director of the United States Patent and Trademark Office*